United States Patent [19]

Weng

[11] Patent Number: 5,451,072
[45] Date of Patent: Sep. 19, 1995

[54] GOLF CART

[76] Inventor: Kuan-Jen Weng, No. 3-12 Min Jue Rd., Tainan, Taiwan

[21] Appl. No.: 260,316

[22] Filed: Jun. 15, 1994

[51] Int. Cl.$^6$ .................................................. B62B 1/04
[52] U.S. Cl. ................................... 280/646; 280/655; 280/DIG. 6
[58] Field of Search ................. 280/645, 646, 42, 652, 280/655, 47.24, DIG. 6

[56] References Cited

U.S. PATENT DOCUMENTS

| | | | |
|---|---|---|---|
| 4,936,598 | 6/1990 | Lee | 280/DIG. 6 X |
| 4,946,186 | 8/1990 | Cheng | 280/646 |
| 5,143,399 | 9/1992 | Liu | 280/646 |
| 5,180,184 | 1/1993 | Chiu | 280/DIG. 6 X |
| 5,249,822 | 10/1993 | Wu | 280/DIG. 6 X |

FOREIGN PATENT DOCUMENTS

78208689  9/1989  Taiwan .
80207447  6/1991  Taiwan .

Primary Examiner—Margaret A. Focarino
Assistant Examiner—Michael Mar
Attorney, Agent, or Firm—Browdy and Neimark

[57] ABSTRACT

A golf cart comprising a handle, an upper tube, a middle tube, an upper cover for the middle tube, a lower tube, an upper cover for the lower tube, an upper bracket, a lower bracket having a support base, a lower cover for the lower tube, a rocking butterfly plate, a rocking slide block, a link assembly and cart wheels, wherein the handle is fixed on an upper end of the upper tube and the upper, middle and lower tubes are fitted into each other and pressed and fixed by screws. The upper bracket and lower bracket are respectively fitted on the middle tube and lower tube and fixed by eccentric pressing blocks. The rocking butterfly plate is fitted on a rear face of the lower tube and fixed by the eccentric pressing block. The rocking slide block is slidably fitted into the dovetail channel of the lower tube. By means of the cooperation of the V-shaped pull lever and link assembly, with the rocking slide block, the wheel support is foldable. The golf cart can be assembled by the user himself/herself and the room for assembling and transferring the golf cart is saved. In addition, the golf cart is assembled mostly by dovetail seat and channel instead of screws so as to reduce the assembling time.

1 Claim, 8 Drawing Sheets

GOLF CART

BACKGROUND OF THE INVENTION

The present invention relates to an improved golf cart which is easily assembled so that the manufacturing cost thereof is reduced.

Taiwanese Application No. 78208689: One conventional golf cart mainly includes a rectangular plane base, two rectangular board-like connecting members, a link assembly composed of rectangular column-like pivot rods, a fastening mechanism composed of two U-shaped members, two arched support plates and two wheels. A tightening means is used to exert a tightening force on screws of the plane base so as to indirectly fold or unfold upper and lower support rods of the golf cart.

Taiwanese Application No. 80207447: A second conventional golf cart is mainly composed of adjusting screws, wheel supports, first pad, second pad, U-shaped fitting block, abutting block, bushings, wheel support pivot shafts, left outer wheel support lever, left inner wheel support lever, right outer wheel support lever, right inner wheel support lever, left wheel seat, right wheel seat and left and right driving levers. According to such arrangements, when the golf cart is folded, a pin member with a handle is first upward pulled in order to inward retract the left outer and left inner wheel support levers and the right outer and right inner wheel support levers into a parallel state. At this time, all the wheel support levers can be folded down about the wheel support pivot shaft into a position substantially parallel to a main support lever for facilitating storage of the golf cart.

These conventional golf carts, have the following shortcomings:

1. Both Taiwanese Applications No. 78208689 and No. 80207447 are assembled by screws so that the assembling procedure is time-consuming and inconvenient. Thus the manufacturing cost of the golf cart is increased.

2. Although both Taiwanese Applications No. 78208689 and No. 80207447 can be folded when not used for facilitating transferring, in Taiwanese Application No. 78208689, only the upper and lower support rods and connecting members can be folded and in Taiwanese Application No. 80207447, the folding is achieved by the bushings so that both folded golf carts still have considerably large volume.

3. In Taiwanese Application No. 80207447, the second golf cart is composed of multiple complex components which are difficult to assemble into the golf cart.

SUMMARY OF THE INVENTION

It is a primary object of the present invention to provide an improved golf cart which is assembled in an easy manner by a user. Moreover, the folded golf cart is smaller in volume making their shipping easier and more economical.

It is a further object of the present invention to eliminate fastening screws in favor of dovetail seats. Further, eccentric wheels are provided so that it is easier to assemble the golf cart. Finally, assembly of the cart is simplified thereby reducing the manufacturing costs.

DETAILED DESCRIPTION OF THE PREFERRED EMBODIMENT

Figure 1:
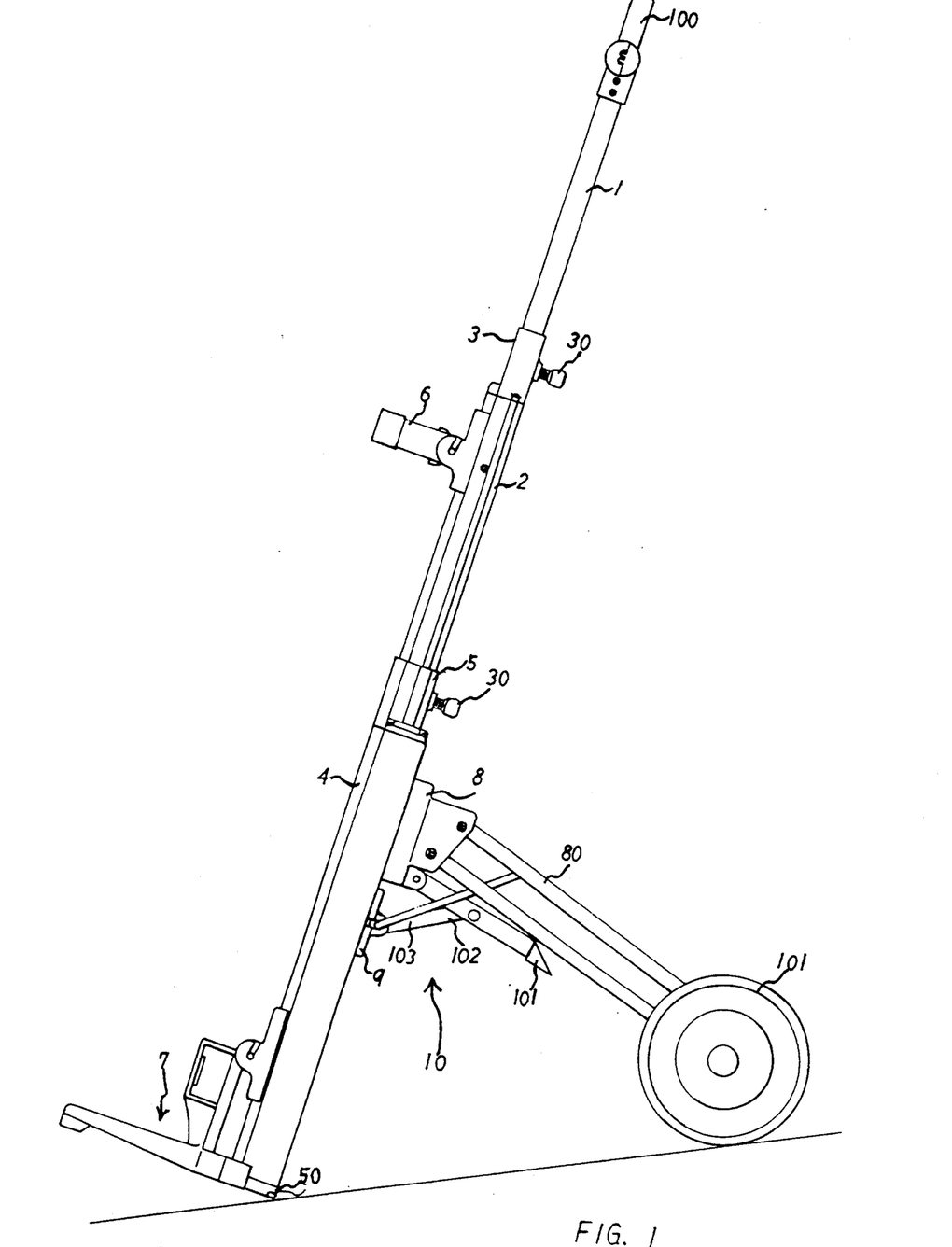
FIG. 1 is a side assembled view of the present invention.

FIG. 1 shows that the golf cart of the present invention includes a handle 100, an upper tube 1, a middle tube 2, an upper cover 3 for the middle tube 2, a lower tube 4, an upper cover 5 for the lower tube 4, an upper bracket 6, a lower bracket 7 having a support base, a lower cover 50 for the lower tube 4, a rocking butterfly plate 8, a rocking slide block 9, a link assembly 10 and cart wheels 101.

Figure 2:
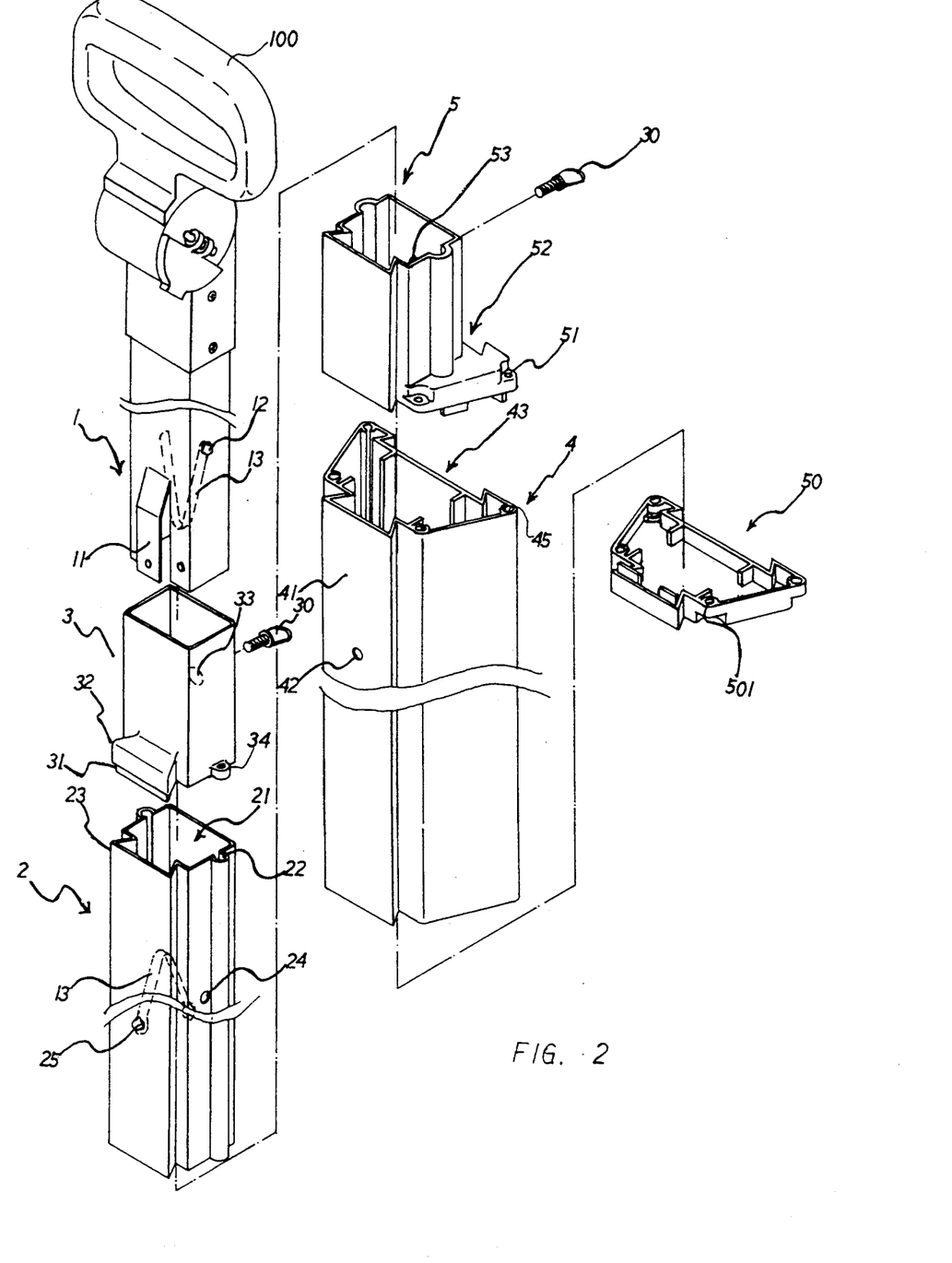
FIG. 2 is a perspective exploded view of a part of the present invention.

The FIG. 2 shows that the upper tube 1 is a rectangular hollow tube with the handle 100 secured at an upper end thereof. A lower end of the upper tube 1 is formed with an upward bent pressing plate 11 for pressing a V-shaped leaf spring 13 inward. Two through holes 12 are formed on lateral sides of the lower end of the upper tube 1 and the leaf spring 13 has two free ends each of which has an outward projecting boss extending through and outside the through holes 12.

The middle tube 2 is also a hollow tube having an interior space 21 corresponding to the upper tube 1. Two lug channels 22 are disposed on two sides of the space 21 corresponding the upper cover 3. A dovetail seat 23 is disposed in front of the space 21 for mounting the upper bracket 6 thereon. Two fixing holes 24 are formed on two sides of upper end of the middle tube 2 for fixing the leaf spring 13 of the upper tube 1. Two through holes 25 are formed on two sides of lower end of the middle tube 2 for mounting a V-shaped leaf spring 13 therein.

The upper cover 3 for the middle tube 2 is a hollow plastic-made member having a lower downward extending fixing block 31 and two lateral lugs 34 for screws to extend through the lugs 34 and lug channels 22 of the middle tube 2 so as to fix the upper cover 3 on the upper end of the middle tube 2. In order to prevent the upper tube 1 from swinging in the middle tube 2, a screw 30 is extended through a thread hole 33 formed on back face of the upper cover 3 to press against the upper tube 1 and fix the same in the middle tube 2.

The lower tube 4 is a hollow tube member having a front dovetail seat 41 for mounting the lower bracket 7 therein and permitting the middle tube 2 to be inserted into the lower tube 4. Two fixing holes 42 are formed on two sides of upper end of the lower tube 4 corresponding to the leaf spring 13 of the middle tube 2. A dovetail channel 43 is disposed at a rear end of the lower tube 4 for mounting the rocking butterfly plate 8 therein. Four thread holes 45 are formed at four corners of the lower tube 4 corresponding to the upper cover 5 for the lower tube 4.

The upper cover 5 for the lower tube 4 has a cross-section which fits within the lower tube 4. Four through holes 51 are disposed at four corners of the upper cover 5 corresponding to the thread holes 45 of the lower tube 4 for engaging the upper cover 5 with the lower tube 4. A dovetail channel 52 is formed on a rear side of lower end of the upper cover 5 and a thread hole 53 is formed on an upper portion of the dovetail channel 52, whereby when the middle tube 2 extends through the upper cover 5 into the lower tube 4, the leaf spring 13 of the middle tube 4 is engaged with the fixing holes 42 of the lower tube 4 and a screw 30 is screwed into the thread hole 53 of the dovetail channel 52 so as to press and fix the middle tube 2 in the lower tube 4.

Figure 3:
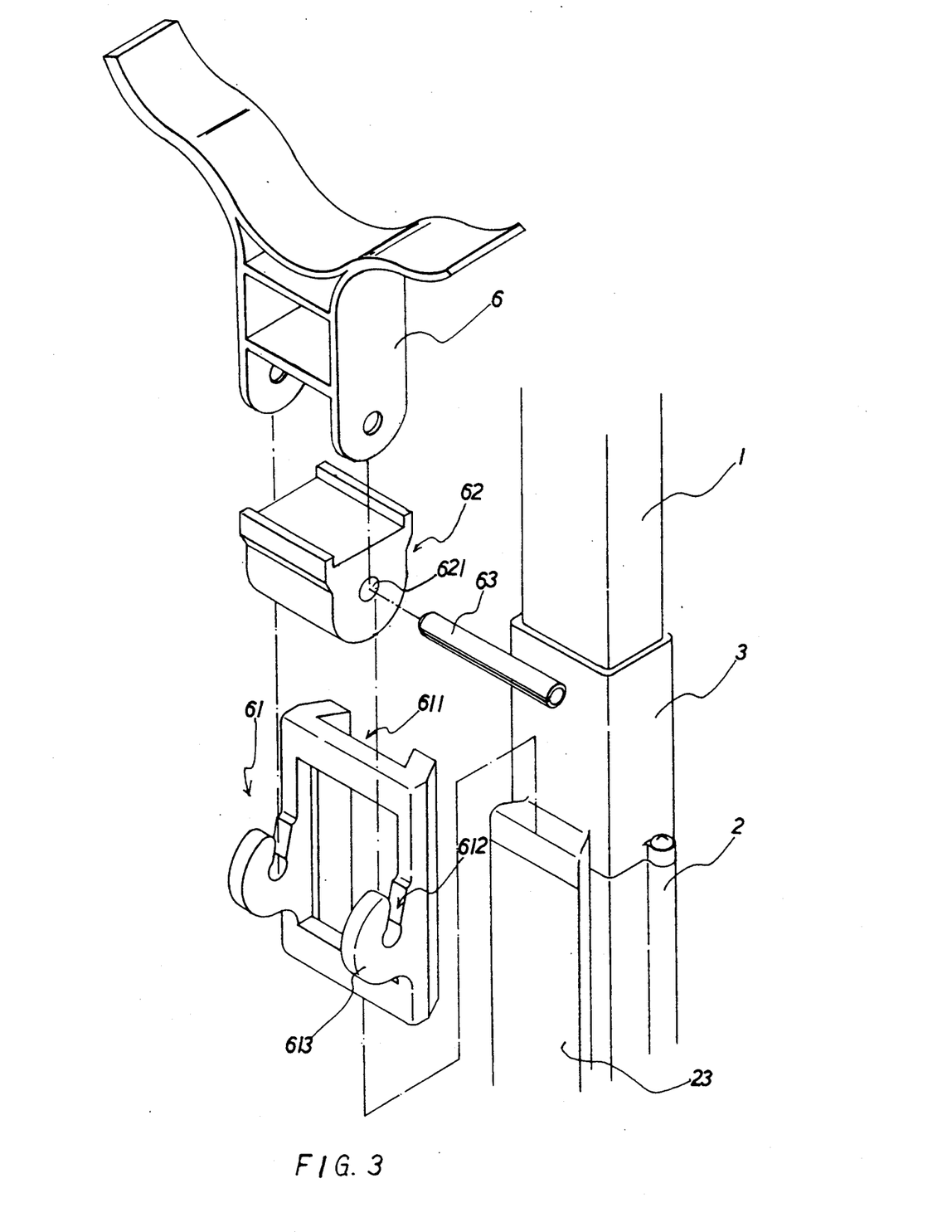
FIG. 3 is a perspective view, showing a part of the present invention.
Figure 4:
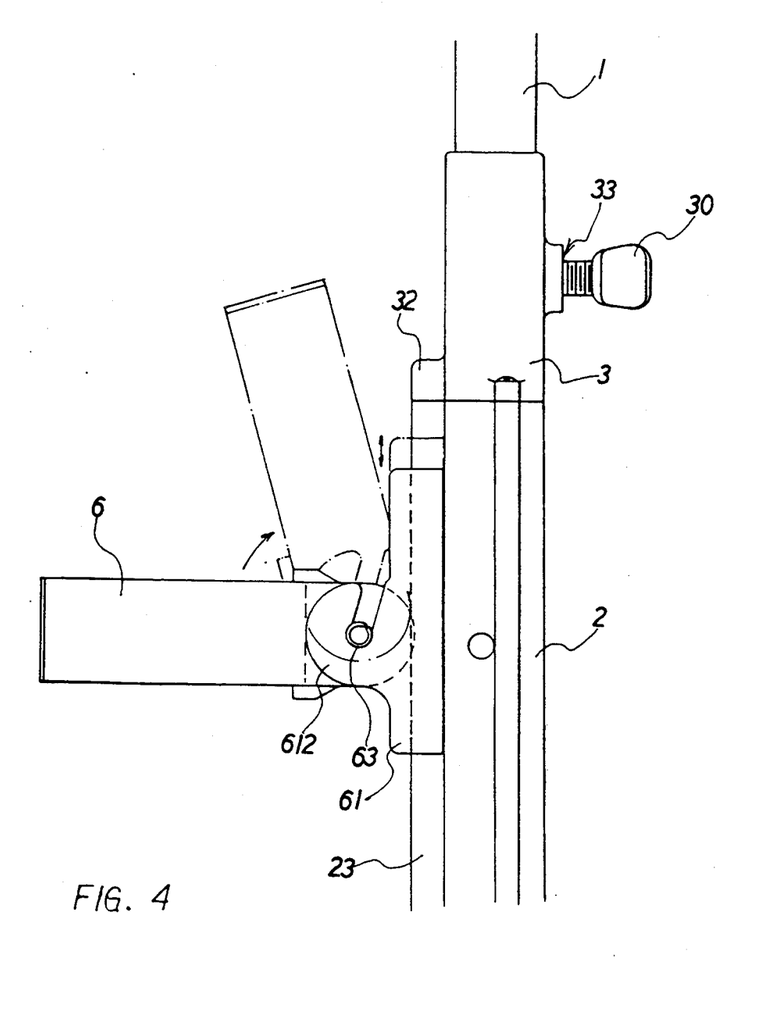
FIG. 4 shows the assembling operation of the upper bracket of the present invention.

Please refer to FIGS. 3 and 4. The upper bracket 6 has an bracket seat 61 and an eccentric pressing block 62. The bracket seat 61 is formed with a dovetail channel 611 whereby the bracket seat 61 can be fitted into the dovetail seat 32 of the upper cover 3 of the middle tube 2 and slidably engaged with the dovetail seat 23 of the middle tube 2. Two ring hooks 613 having inclined slots 612 extend from two lateral sides of the bracket seat 61. The bracket seat 61 is a frame-like member so that a spring pin 63 is extended through both the upper bracket 6 and the eccentric pressing block 62 with an eccentric hole 621. In addition, the spring pin 63 passes through the inclined slots 612 of the ring hooks 613 into a central portion thereof. At this time, the eccentric pressing block 62 is rotated to press against the dovetail seat 23 of the middle tube 2 and fix the upper bracket 6 therein.

Figure 5:
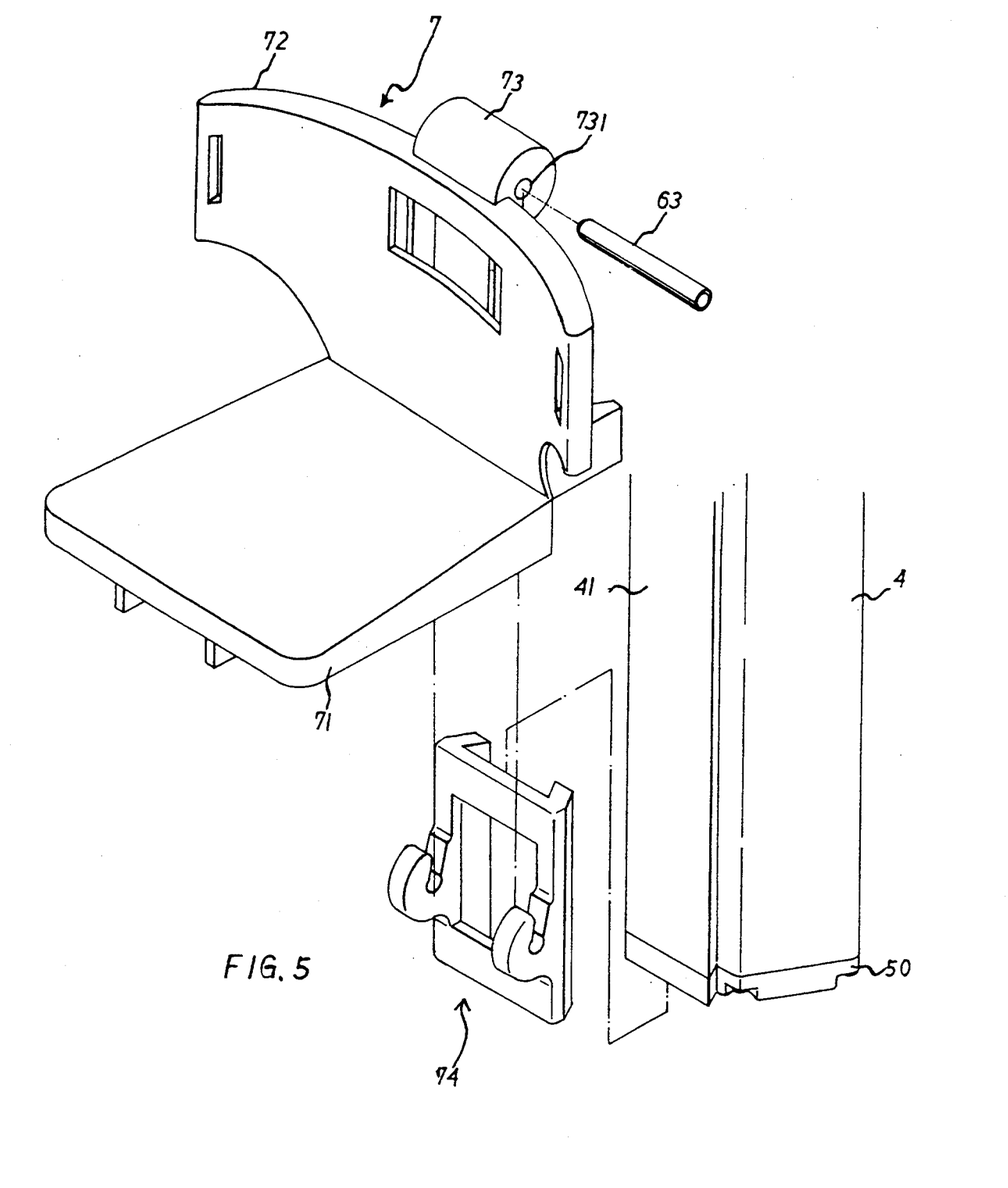
FIG. 5 is a perspective view of the lower bracket and support base of the present invention.
Figure 6:
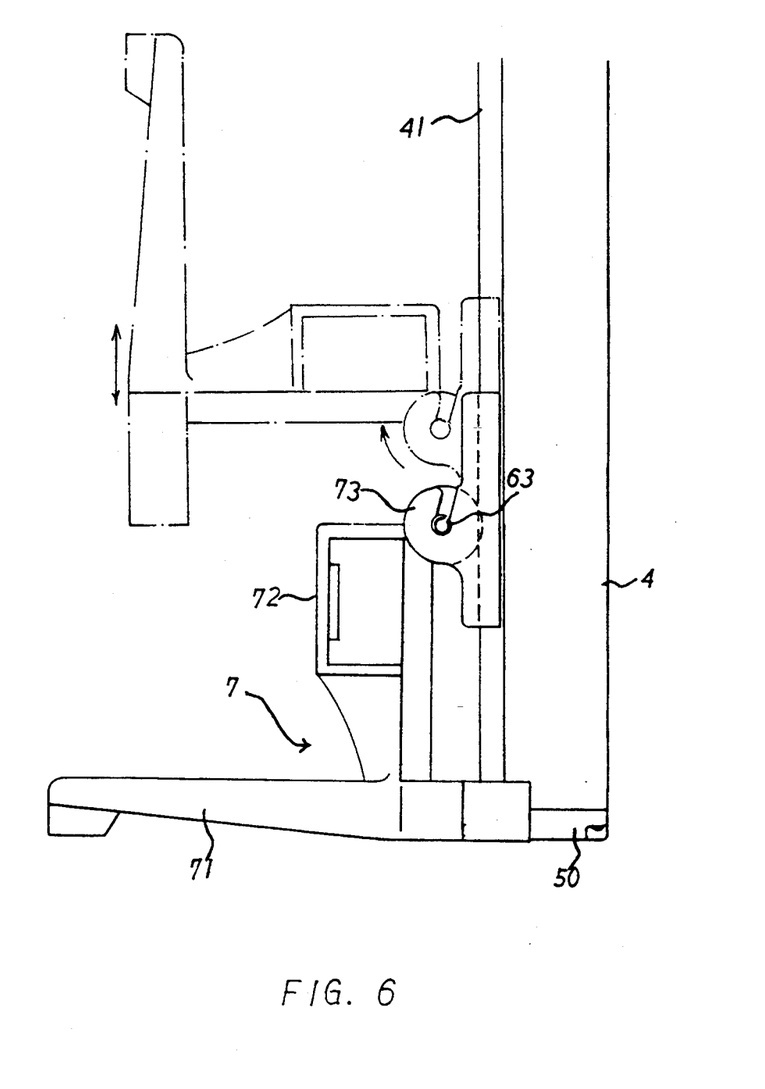
FIG. 6 shows the assembling operation of the support base of the present invention.

The FIGS. 5 and 6 show that the lower bracket 7 includes a support base 71 and a lower bracket portion 72 integrally connected with the support base 71. An eccentric block 73 is formed at a top end of the lower bracket portion 72. An eccentric hole 731 is formed on the eccentric block 73. A lower bracket seat 74 structurally identical to the upper bracket seat 61 is fitted into the dovetail seat 41 of the lower tube 4. A spring pin 63 extends through the lower bracket seat 74 and the eccentric hole 731 of the eccentric block 73, whereby the lower bracket 7 is rotated, making the eccentric block 73 press against the dovetail seat 41 of the lower tube 4 and fix the lower bracket 7 therein.

The FIG. 2 shows that the lower cover 50 for the lower tube 4 has a cross-section identical to that of the lower tube 4. Four thread holes 501 are formed at four corners of the lower cover 50 corresponding to the lower tube 4 for fixing the same on the lower cover 50.

Figure 7:
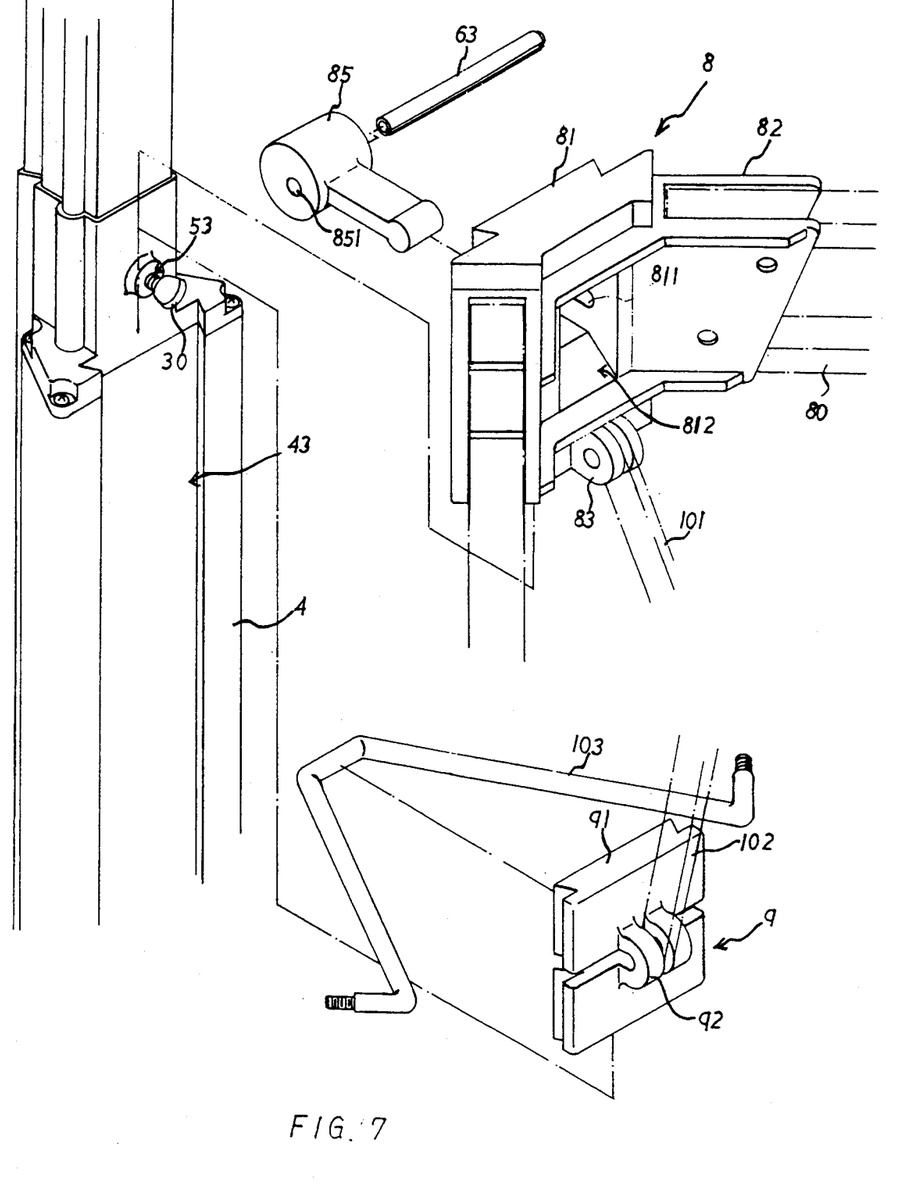
FIG. 7 is a perspective view of the rocking butterfly plate, rocking slide block and link assembly of the present invention.

Please refer to FIG. 7. The rocking butterfly plate 8 is integrally formed, and has a front dovetail seat 81, two lateral wings 82 on which rocking arms 80 are disposed, and a rear fixing plate 83. A through channel 812 with a transverse slot 811 is disposed at a central portion of the dovetail seat 81. A spring pin 63 is extended through an eccentric hole 851 of an eccentric pressing block 85 which is disposed in the through channel 812 of the dovetail 81. The eccentric pressing block 85 is rotated to press against the dovetail channel 43 of the lower tube 4 and fixed therein.

The rocking slide block 9 is integrally formed, having a front dovetail seat 91 which is slidably fitted into the dovetail channel 43 of the lower tube 4 and disposed under the rocking butterfly plate 8. The rocking slide block 9 has two rear opposite lugs 92 for controlling a V-shaped pull lever 103, making the same slide along with the rocking slide block 9. In addition, the pull lever 103 is fixed on the rocking arm 80 by screws.

Figure 8:
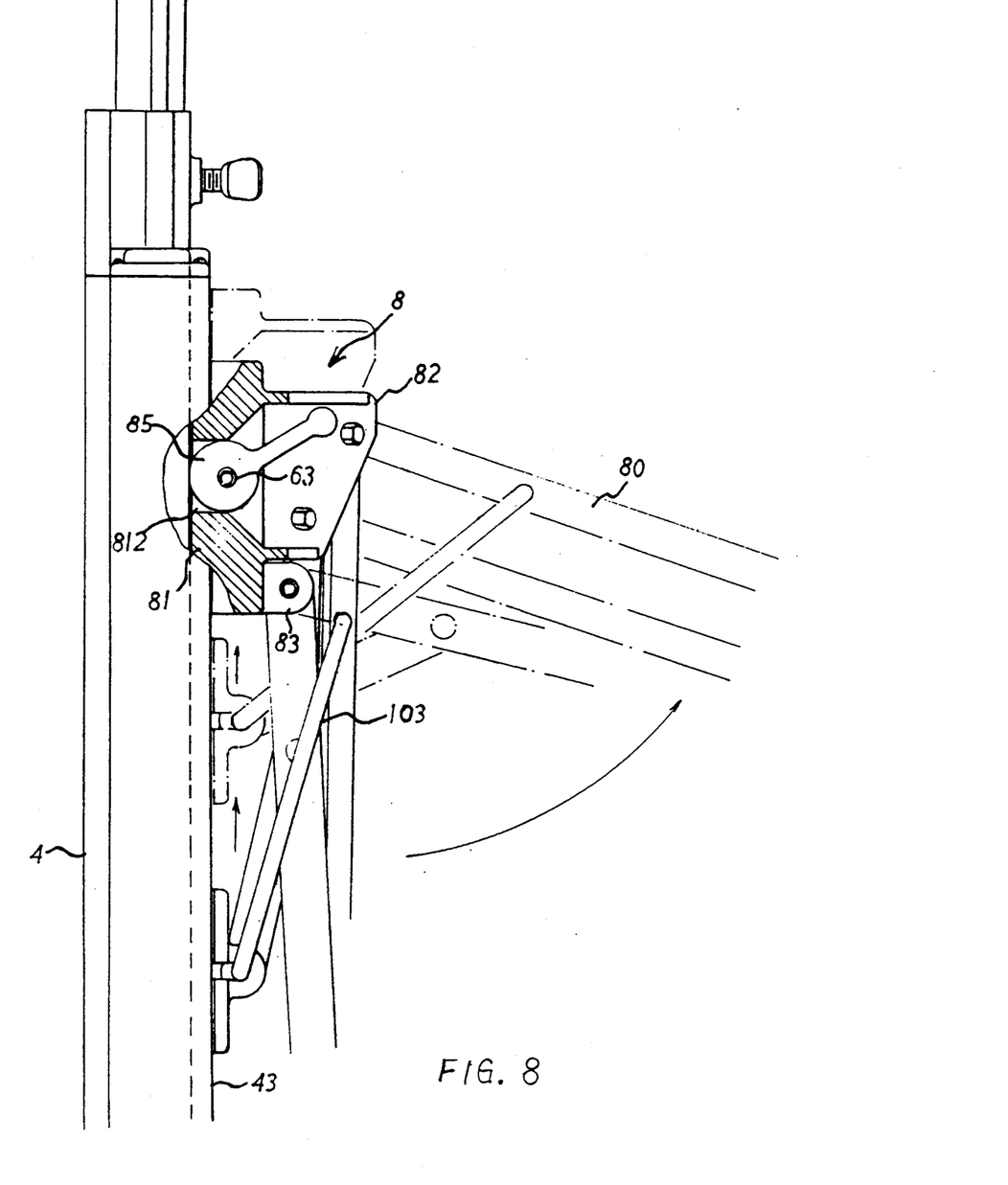
FIG. 8 shows the operation of the rocking butterfly plate, rocking slide block and link assembly of the present invention.

The FIG. 8 shows that the link assembly 10 includes a folding lever 101, a linking lever 102 and a V-shaped pull lever 103. One end of the linking lever 102 is pivotally connected with the lug 92 of the rocking slide block 9 and the other end thereof is pivotally connected with the folding lever 101. One end of the folding lever 101 is pivotally connected with the fixing plate 83 of the rocking butterfly plate 8. The V-shaped pull lever 103 is controlled by the rocking slide block 9 and the linking lever 102 is respectively pivotally connected with the rocking slide block 9 and folding lever 101 so that the folding lever 101 is used to control the rocking slide block 9 to slide within the dovetail channel 43 of the lower tube 4 and control the V-shaped pull lever 103 to fold the rocking arm 80.

According to the above arrangements, when assembled, the handle 100 is first screwed on the upper end of the upper tube 1 and the upper tube 1 is inserted into the upper cover 3 and the middle tube and located therein. Then the screw 30 is extended into the through hole 33 of the upper cover 3 of the middle tube 2 to fix the upper tube 1 in the middle tube 2. Then the middle tube 2 is inserted into the upper cover 5 of the lower tube 4 and located therein. Then the screw 30 is screwed into the through hole 53 of the upper cover 5 to fix the middle tube 2 in the lower tube 4. Then the upper bracket 61 is fitted onto the middle tube 2 and the spring pin 63 is used to connect the upper bracket 6 and eccentric pressing block 62. Then the eccentric pressing block 62 is rotated to press against the middle tube 2 and fixed thereon. Then the lower bracket seat 74 is fitted into the dovetail seat 41 of the lower tube 4 and the spring pin 63 is extended through the lower bracket seat 74 and eccentric block 73 of the lower bracket 7. Then the eccentric block 73 is rotated to fix the lower bracket 7 on the dovetail seat 41 of the lower tube 4. Then the rocking butterfly plate 8 is fitted into the dovetail channel 43 of the lower tube 4 and the eccentric pressing block 85 is rotated to press and fix the rocking butterfly plate 8 on a rear face of the lower tube 4. Then the rocking arm 80 is screwed on the lateral wings 82 of the rocking butterfly plate 8 and the rocking slide block 9 is slidably fitted into the dovetail channel 43 of the lower tube 4. Then the V-shaped pull lever 103 is extended into the rocking slide block 9 to connect with the rocking arm 80. At this time, the folding lever 101 of the link assembly 10 is able to control the sliding of the rocking slide block 9 and the folding of the rocking arm 80.

The present invention has the following advantages:

1. The golf cart of the present invention can be easily and quickly assembled.

2. The golf cart can be assembled by the user himself/herself and the room for assembling and transferring the golf cart is saved.

3. The golf cart is assembled mostly by use of seats and channels instead of screws so that the assembling time is greatly reduced.

4. The manufacturing cost and transferring cost of the golf cart are reduced.

The above preferred embodiment is only an example of the present invention and the scope of the present invention should not be limited to the example. Any modification or variation derived from the example should fall within the scope of the present invention.

What is claimed is:

1. A golf cart comprising a handle, an upper tube, a middle tube, an upper cover for the middle tube, a lower tube, an upper cover for the lower tube, an upper bracket, a lower bracket having a support base, a lower cover for the lower tube, a rocking butterfly plate, a rocking slide block, a link assembly, left rocking arms, right rocking arms and cart wheels, wherein the handle is fixed on an upper end of the upper tube and the left rocking arms are connected between the rocking butterfly plate and connecting members for installing the wheels, the rocking arms being driven by the link assembly to retract or stretch the wheels, said golf cart being characterized in that:

the upper tube being a rectangular hollow tube, a lower end of the upper tube being formed with an upward bent pressing plate, two through holes being formed on lateral sides of the lower end of the upper tube for disposing therein a V-shaped leaf spring which has two free ends each of which has an outward projecting boss extending through and outside the through holes of the upper tube;

the middle tube also being a hollow tube having an interior space corresponding to the upper tube, two lug channels being disposed on two sides of the space of the middle tube corresponding to the upper cover, a dovetail seat being disposed in front of the space, two fixing holes being formed on two sides of an upper end of the middle tube, two through holes being formed on two sides of a lower end of the middle tube for mounting a V-shaped leaf spring therein;

the upper cover for the middle tube being a hollow plastic-made member having a lower dovetail seat with a fixing block, a fixing through hole being disposed on a rear face of the upper cover for the middle tube, two lateral lugs being disposed on two lateral sides of the upper cover for the middle tube, whereby the dovetail seat thereof is engaged with the dovetail seat of the middle tube and the lugs of the upper cover for the middle tube are engaged with the lug channels of the middle tube by screws, so that the upper cover is pressed and inserted through the upper cover for the middle tube into the middle tube and fixed therein by the engagement between the V-shaped leaf spring and the fixing holes of the middle tube, and in order to prevent the upper tube from swinging in the middle tube, a screw is extended through a thread hole formed on back face of the upper cover for the middle tube to press against the upper tube and fix the same in the middle tube;

the lower tube is a hollow tube member having a front dovetail seat for mounting the lower bracket therein and permitting the middle tube to be inserted into the lower tube, two fixing holes being formed on two sides of upper end of the lower tube corresponding to the leaf spring of the middle tube, a dovetail channel is disposed at a rear end of the lower tube four thread holes being formed at four corners of the lower tube corresponding to the upper cover for the lower tube;

the upper cover for the lower tube has a cross-section identical to that of the lower tube, four through holes being disposed at four corners of the upper cover corresponding to the thread holes of the lower tube for engaging the upper cover with the lower tube, a dovetail channel being formed on a rear side of lower end of the upper cover and a thread hole being formed on an upper portion of the dovetail channel, whereby when the middle tube extends through the upper cover into the lower tube, the leaf spring of the middle tube is engaged with the fixing holes of the lower tube and a screw is screwed into the thread hole of the dovetail channel so as to press and fix the middle tube in the lower tube;

the upper bracket has a bracket seat and an eccentric pressing block, the bracket seat being formed with a dovetail channel, whereby the bracket seat is fitted into the dovetail seat of the upper cover for the middle tube and slidably engaged with the dovetail seat of the middle tube, two ring hooks having inclined slots extending from two lateral sides of the bracket seat, the bracket seat being a frame-like member so that a spring pin is extended through both the upper bracket and the eccentric pressing block with an eccentric hole and the spring pin passes through the inclined slots of the ring hooks into a central portion thereof, whereby the eccentric pressing block is rotated to press against the dovetail seat of the middle tube and fix the upper bracket therein;

the lower bracket includes a support base and a lower bracket portion integrally connected with the support base, an eccentric block being formed at a top end of the lower bracket portion, an eccentric hole being formed on the eccentric block, a lower bracket seat structurally identical to the upper bracket seat being fitted into the dovetail seat of the lower tube, a spring pin extending through the lower bracket seat and the eccentric hole of the eccentric block, whereby the lower bracket is rotated, making the eccentric block press against the dovetail seat of the lower tube and fix the lower bracket therein;

the lower cover for the lower tube has a cross-section identical to that of the lower tube, four thread holes being formed at four corners of the lower cover corresponding to the lower tube for fixing the same on the lower cover;

the rocking butterfly plate is integrally formed, having a front dovetail seat, two lateral wings on which the rocking arms are disposed, and a rear fixing plate, a through channel with a transverse slot being disposed at a central portion of the dovetail seat, a spring pin being extended through an eccentric hole of an eccentric pressing block which is disposed in the through channel of the dovetail, the eccentric pressing block being rotated to press against the dovetail channel of the lower tube and fixed therein;

the rocking slide block is integrally formed, having a front dovetail seat which is slidably fitted into the dovetail channel of the lower tuber and disposed under the rocking butterfly plate, the rocking slide block having two rear opposite lugs for controlling a V-shaped pull lever, making the same slide along with the rocking slide block and the pull lever being fixed on the rocking arm by screws; and the link assembly includes a folding lever, a linking lever and a V-shaped pull lever, one end of the linking lever being pivotally connected with the lug of the rocking slide block and the other end thereof is pivotally connected with the folding lever, one end of the folding lever being pivotally connected with the fixing plate of the rocking butterfly plate, the V-shaped pull lever being controlled by the rocking slide block and the linking lever being respectively pivotally connected with the rocking slide block and folding lever so that the folding lever controls the rocking slide block to slide within the dovetail channel of the lower tube and control the V-shaped pull lever to fold the rocking arm, whereby when assembled, the upper, middle and lower tubes are fitted into each other by means of the engagement between the V-shaped leaf springs disposed therein and the fixing holes disposed thereon, and the screws are screwed into the upper covers for the middle tube and lower tube for pressing and fixing the upper tube and lower tube, the upper bracket and lower bracket being respectively fitted on the middle tube and lower tube and fixed by the eccentric pressing blocks, the rocking butterfly plate being fitted into the lower tube and fixed therein by the eccentric pressing block, the rocking slide block being slidably fitted into the dovetail channel of the lower tube, the V-shaped pull lever being extended into the rocking slide block to be restricted therewithin and slide along therewith, the link assembly controlling the sliding of the rocking slide block and the folding of the rocking arm.

* * * * *